Figure 14:
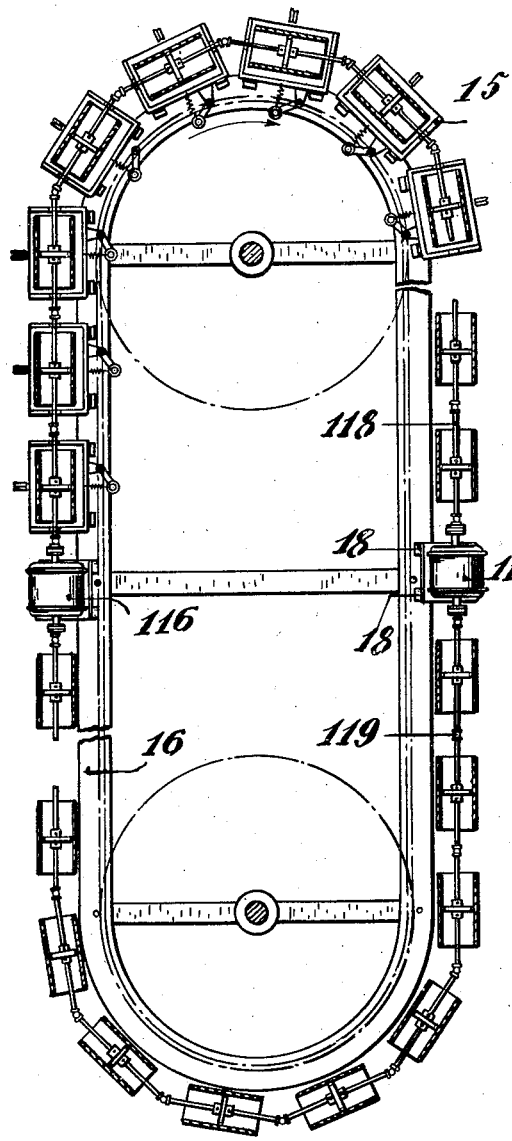

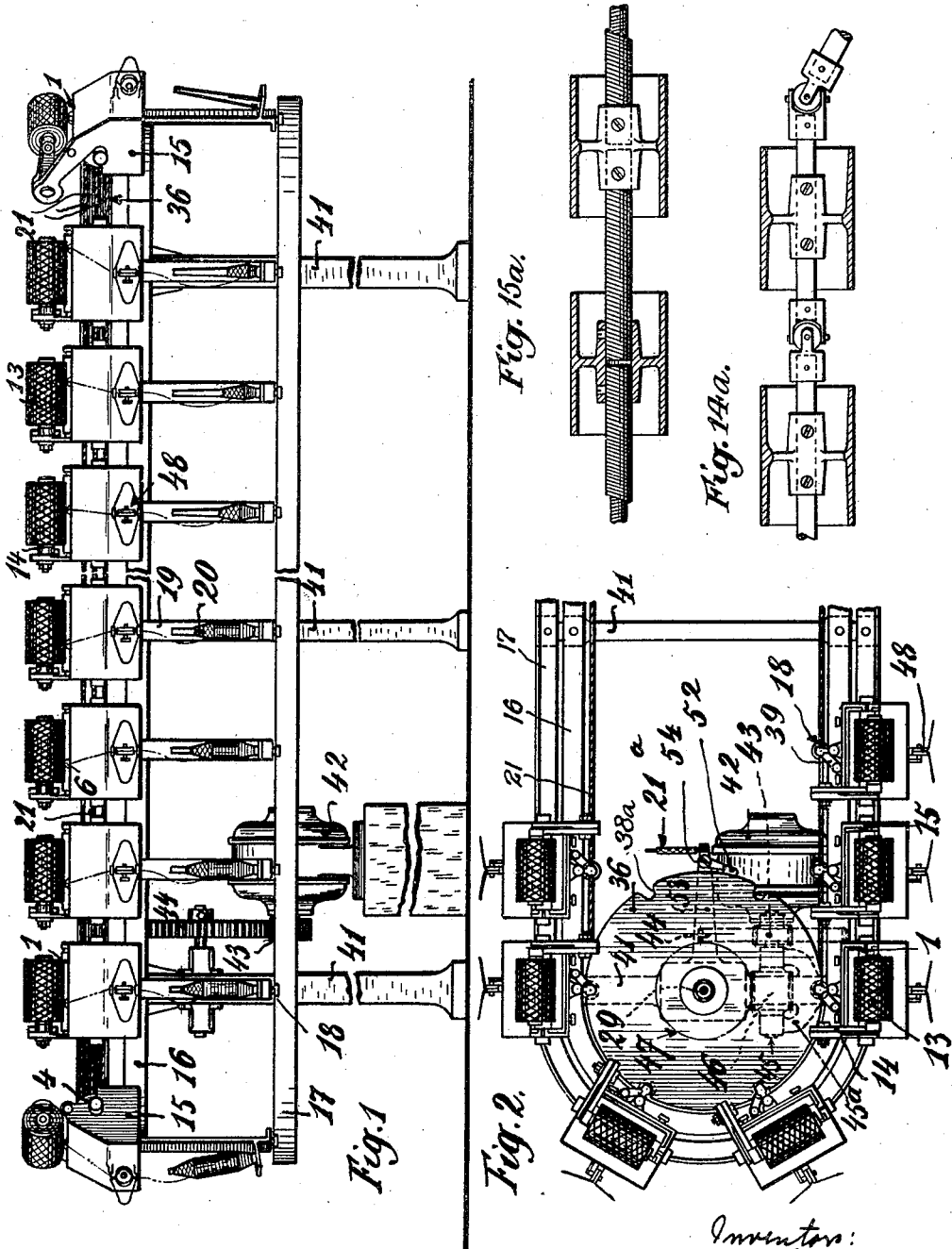

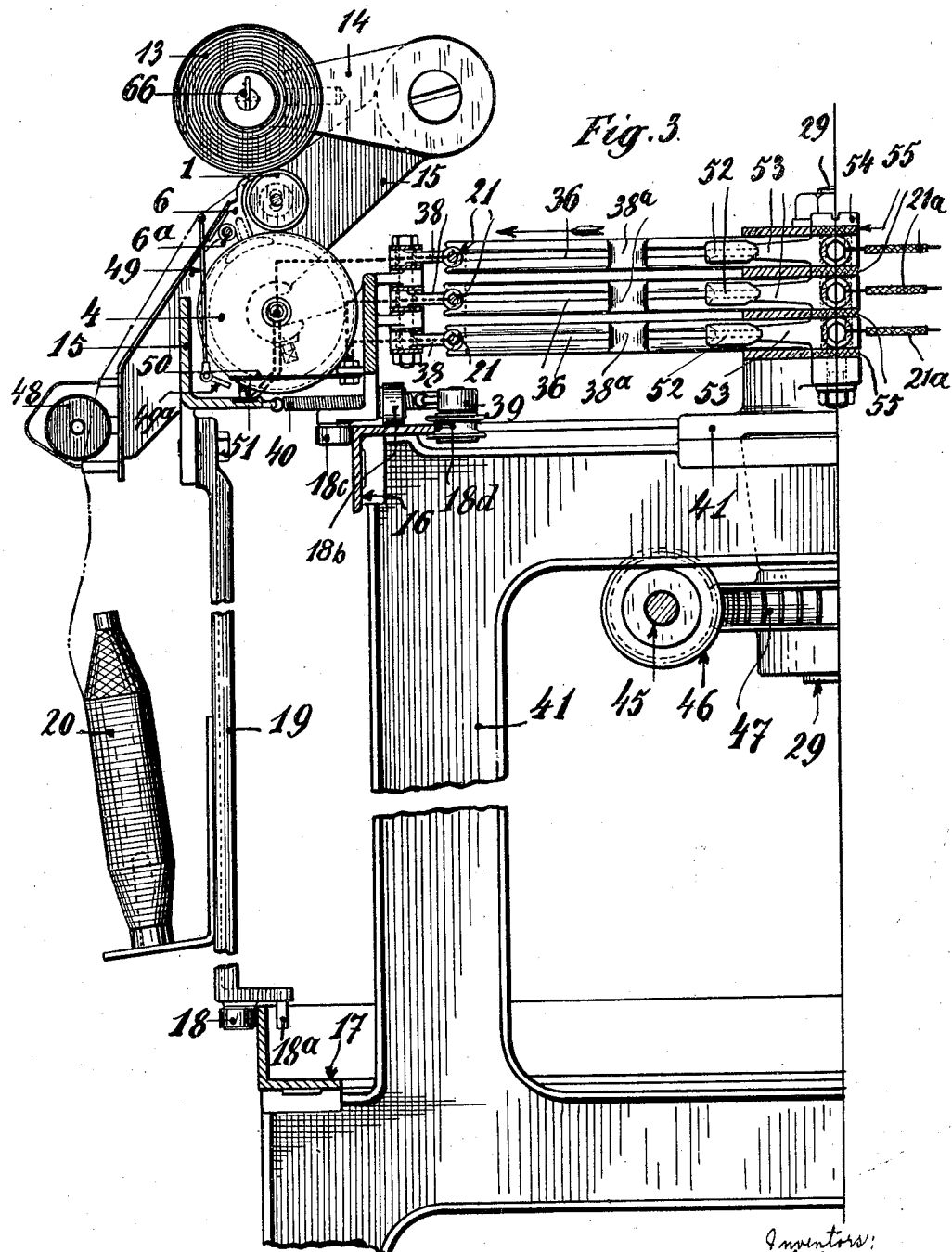

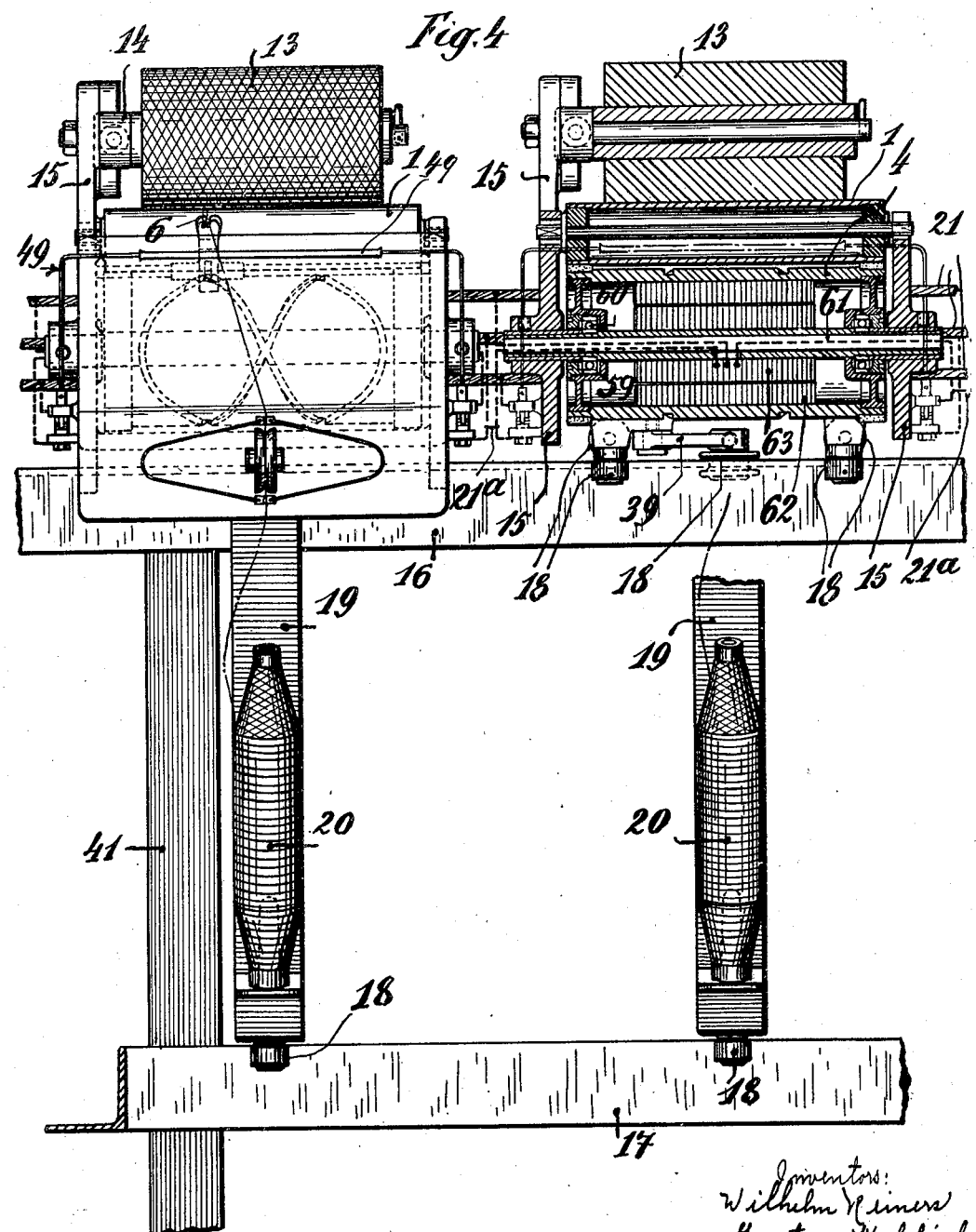

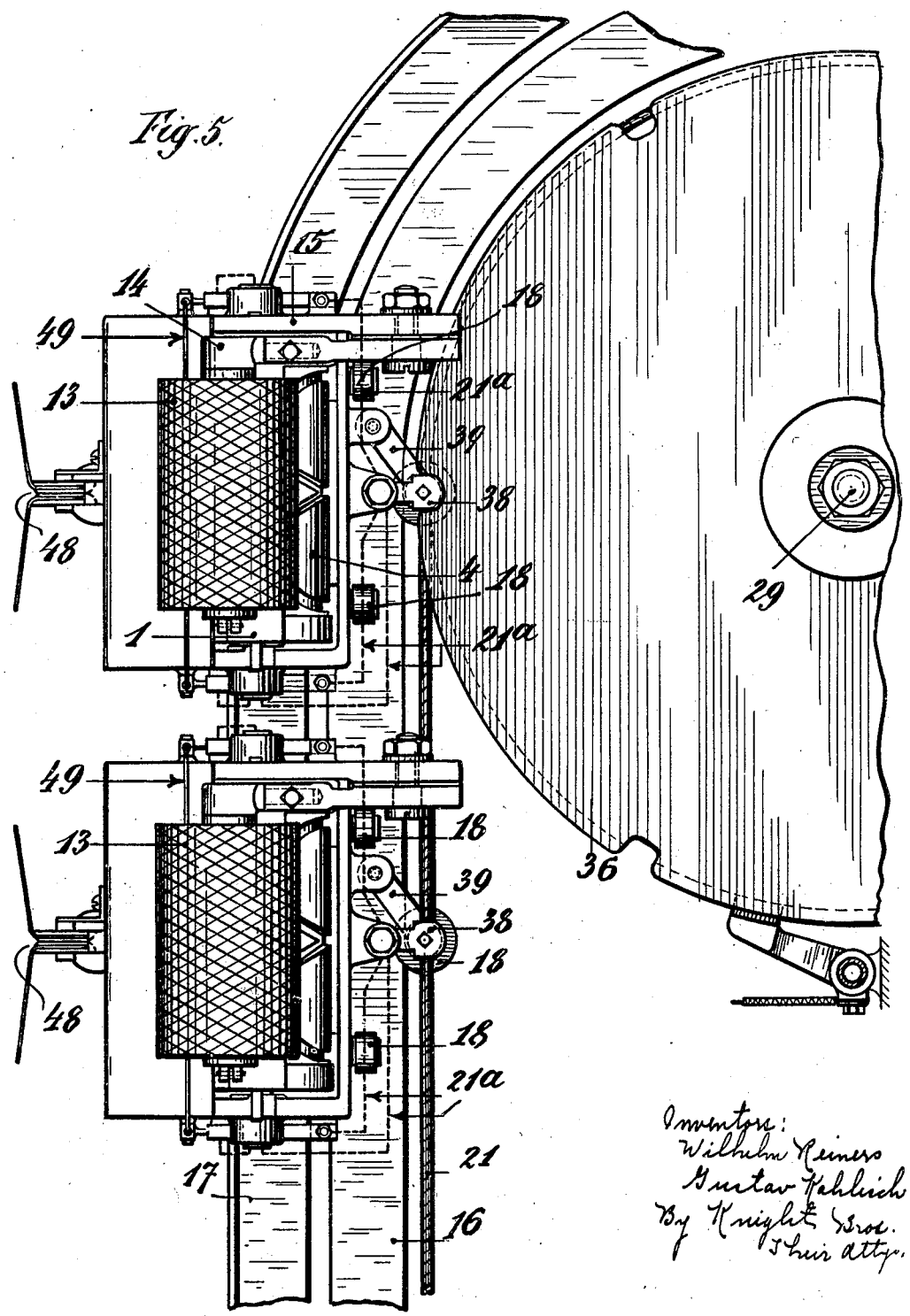

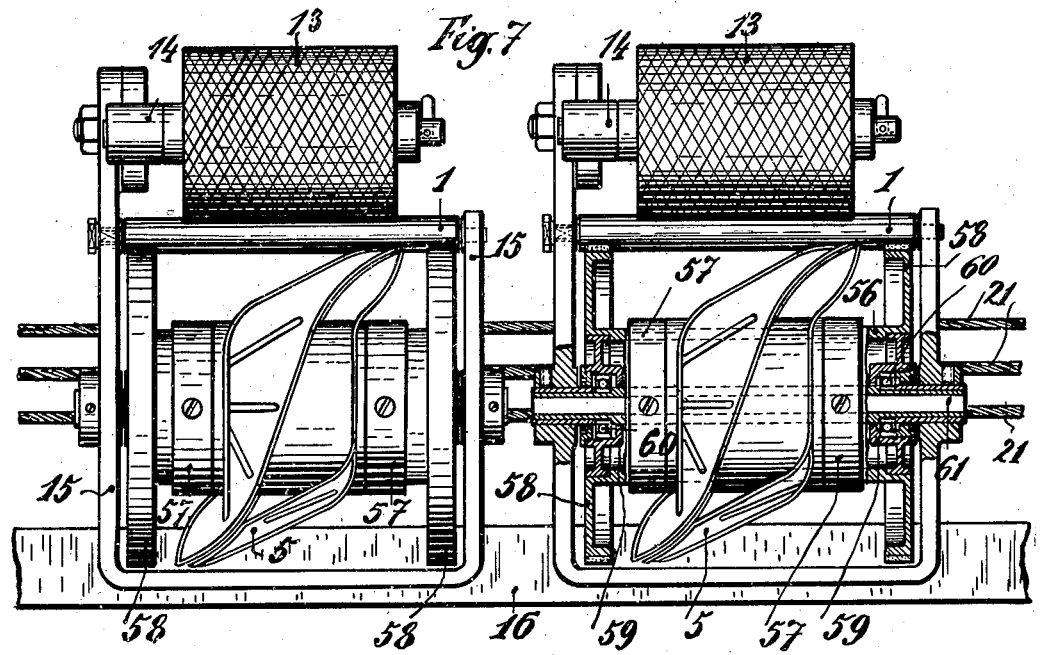
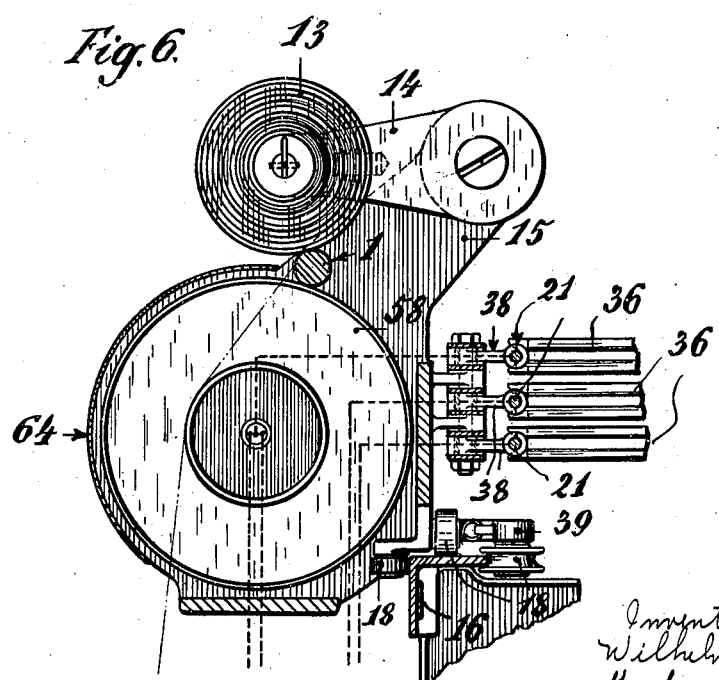

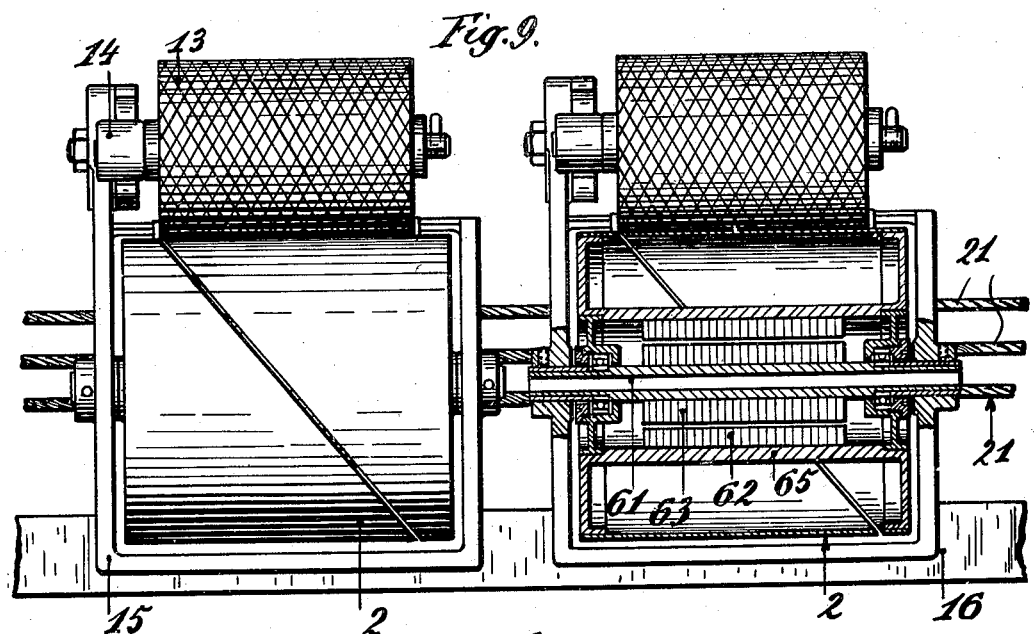
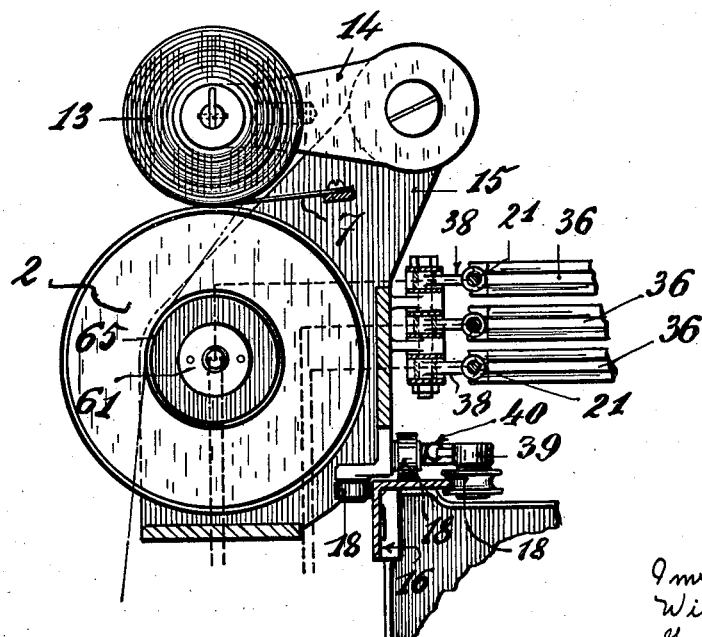

June 30, 1936.  W. REINERS ET AL  2,045,872
WINDING MACHINE
Filed May 26, 1933   15 Sheets-Sheet 7
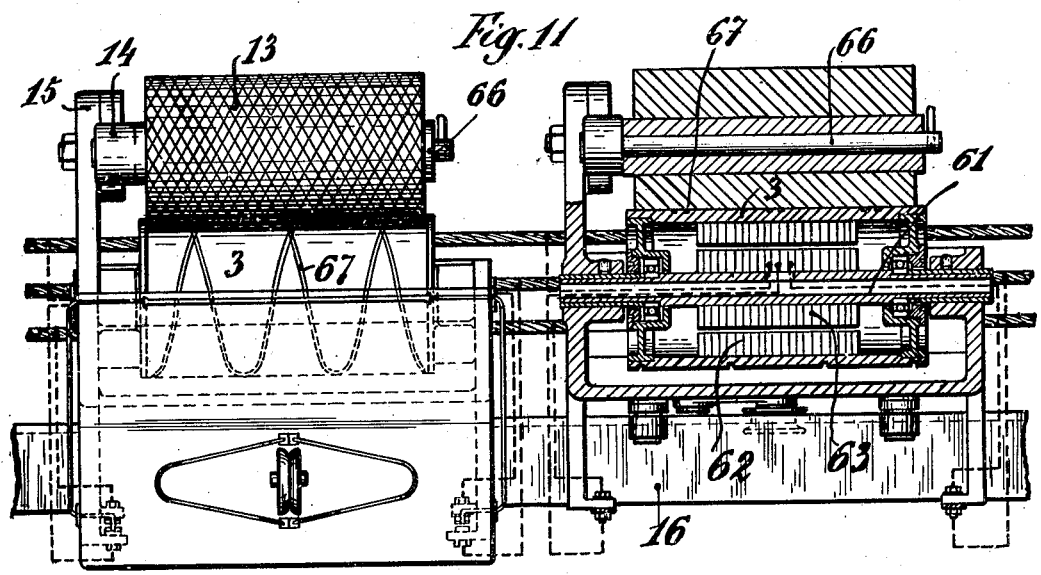
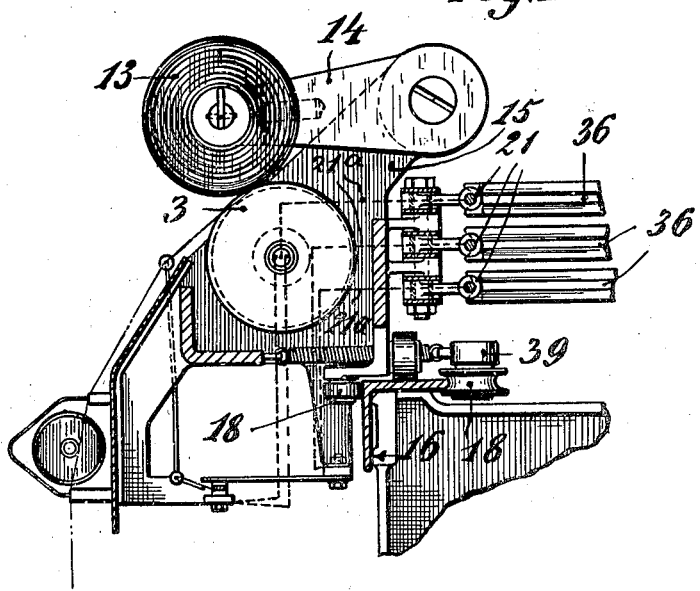

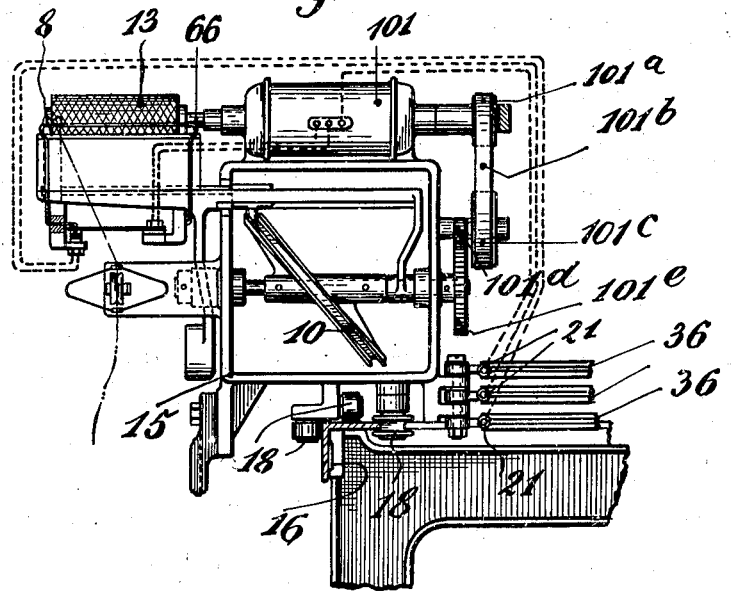
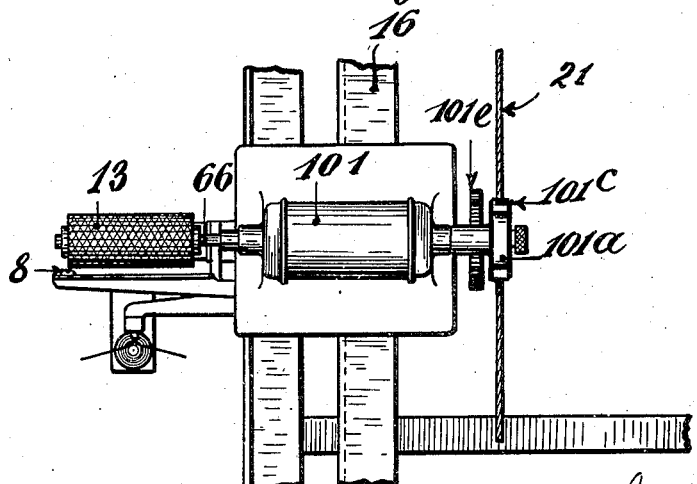

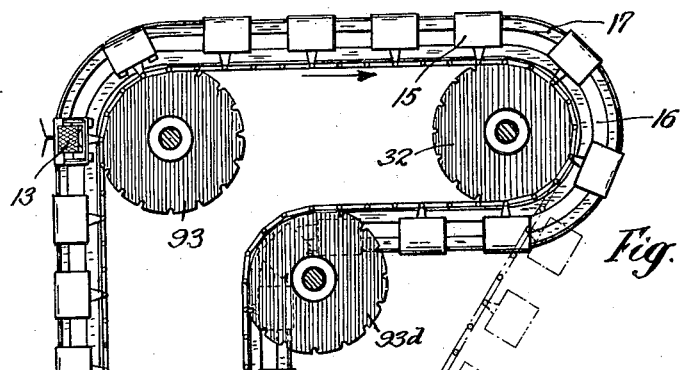
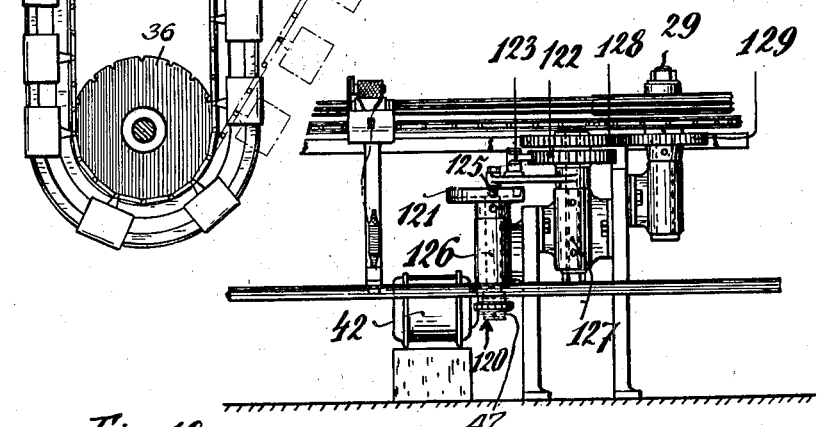
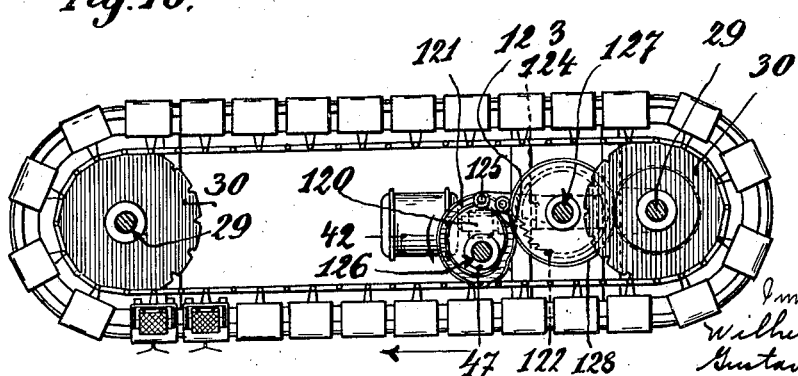

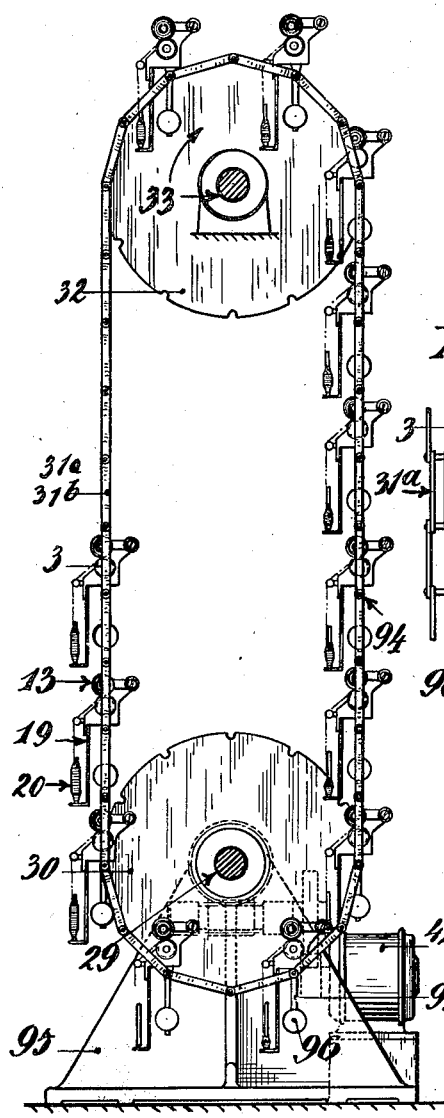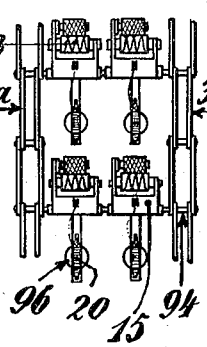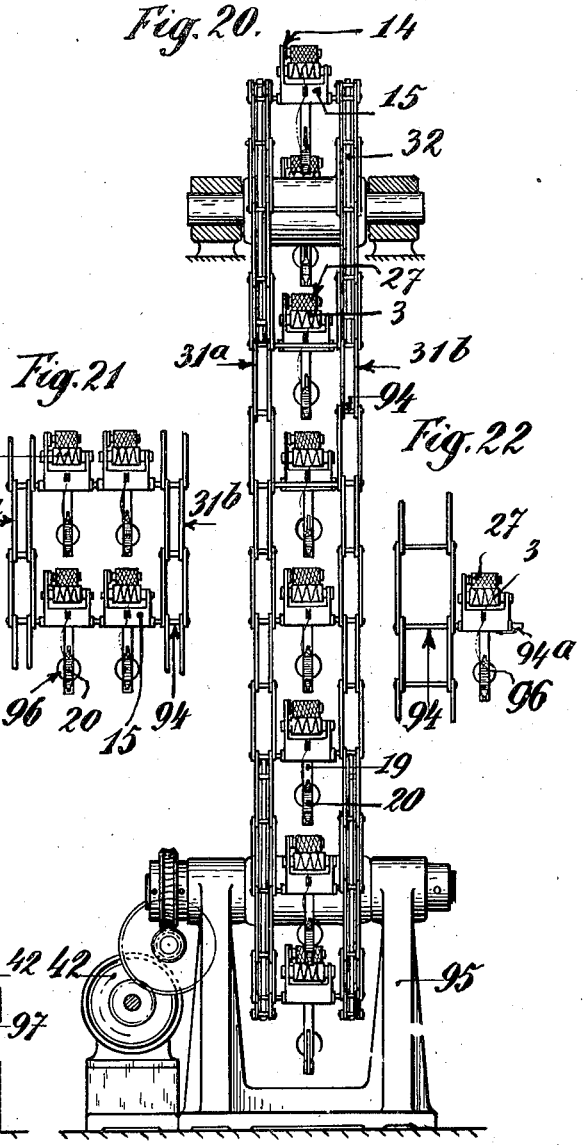

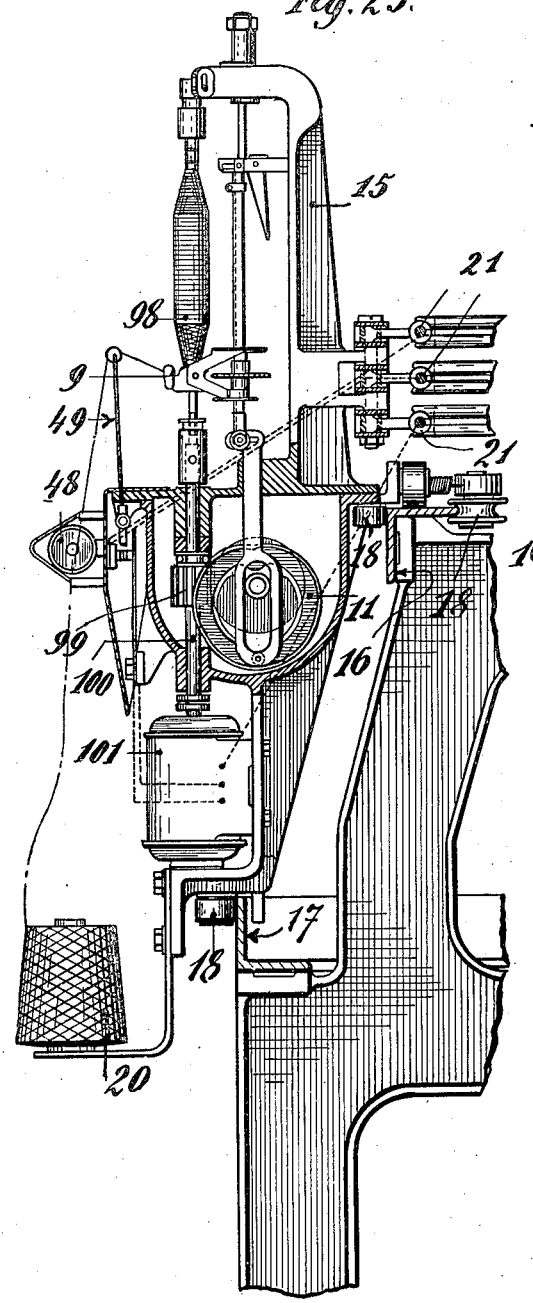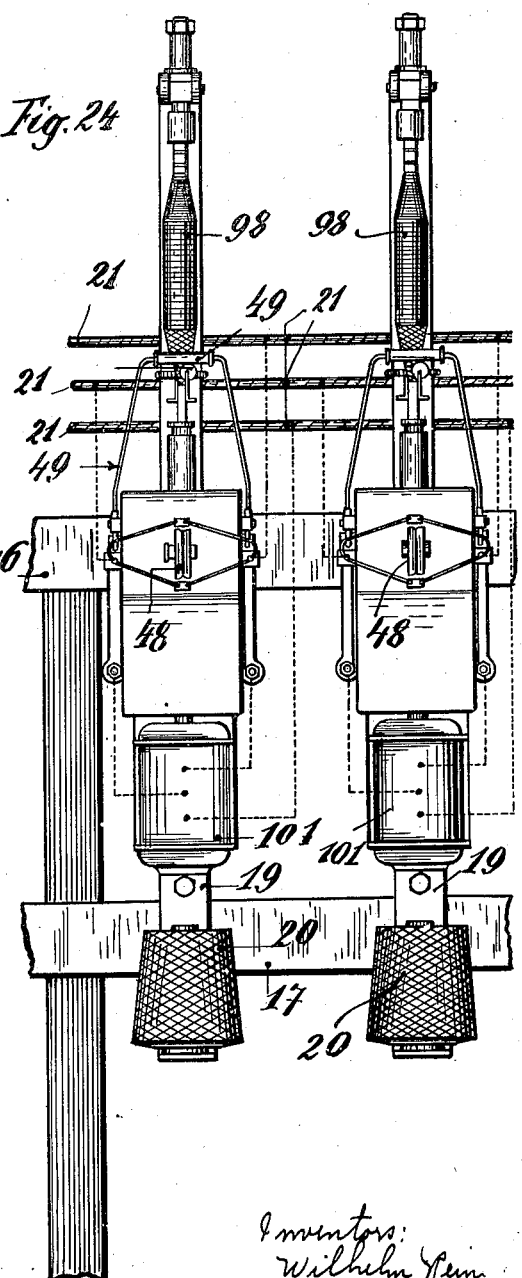

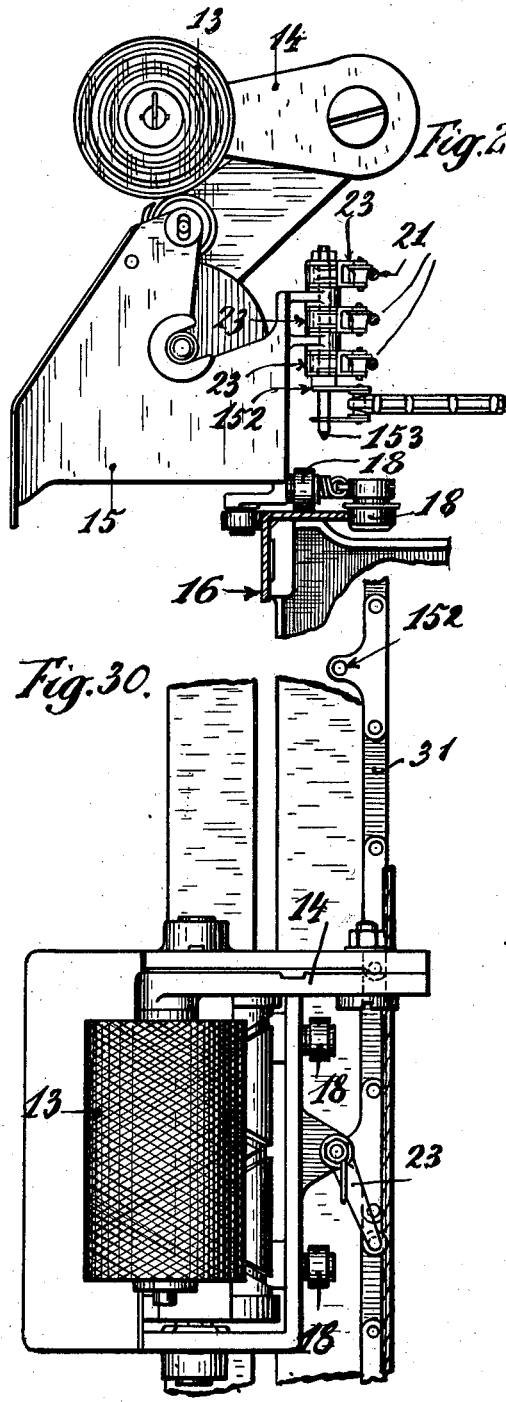

Patented June 30, 1936

2,045,872

UNITED STATES PATENT OFFICE 2,045,872

WINDING MACHINE

Wilhelm Reiners and Gustav Kahlisch, Gladbach-Rheydt, Germany, assignors to W. Schlafhorst & Co., Gladbach-Rheydt, Germany, a corporation of Germany Application May 26, 1933, Serial No. 673,096
In Germany June 16, 1932

12 Claims. (Cl. 242—35.5)

There have been up to now two different kinds of winding machines with travelling spindle units which can be moved round the machine on an endless path.

The one kind comprises the so-called circular frames in which the feasible number of units is limited to a comparatively small figure, because the diameter will otherwise become too large. In this case the units are secured to wheels or radially arranged carriers, which can be turned as required for the purpose of attending them, from a particular place, the stand of the operative.

In the other kind of machines with travelling spindle units, the latter are moved round the machine along a stationary path by means of some endless conveying arrangement with chains, ropes, tapes, belts or the like. Unlike the above circular frames, machines of this kind can be made of any desired length. According to the number of travelling spindle units, it is usual to have the machine attended by one or two operatives who take up a particular place which they need not leave in contradistinction to all machines with stationary spindle units where the operative has to run to and fro.

However, the machines hitherto known, which are fitted with endless conveying means, have the drawback of a too low efficiency, as the travelling spindle units on one or both spindle heads are separated from their driving means during the travel in the curves where they are therefore taken out of action, the spindle units being kept in contact with their driving means only on the two straight lateral paths of the machine.

Even, before the curves begin, the driven bobbins or packages leave the driving means formed by a correspondingly long driving shaft, thus being taken out of action. For a machine of say 60 spindles this means an inevitable constant stoppage of 15 spindles or twenty five per cent of the total number of spindles which means that the efficiency of the machine can never exceed 75% even under the most favorable circumstances. In another example of machines of this kind, in which the spindles are taken out of action at one end only, the loss is smaller but it is still about 12 to 15 per cent.

The first one of the aforementioned machines has also the great drawback that the upper yarn layer of the packages travelling in axial direction on the stationary winding drum or shaft receives additional stresses through this lateral displacement which incidentally also necessitates the immediate mechanical raising of the packages from the winding drum, in order to avoid felting of the upper yarn layers. The machine mentioned in the second place shows the same drawback in an even higher degree, because here an endless belt travels at a high speed past the packages which it turns, the running of the belt being mostly unsteady and vibratory. This renders the employment of such machines impossible for fine and delicate yarns, particularly for cross-wound packages. For this reason, the two kinds of machines mentioned above have not found their way into the mills on a large scale.

The present invention has for its object not only to do away with all the drawbacks of all the machines hitherto known having travelling spindle units and to render them therefore more suitable and more valuable for the general practice, but also to simplify and form the whole construction in such a fashion that the machine becomes less complicated and less subject to stoppages, and that it also works economically when for any reason some of the spindles are taken out of action.

The desired object is attained particularly by making the driving means of the spindle units to take part in their travel. Each particular spindle unit can be considered as an independent entity and arranged in such a fashion that any number of the separate units can be exchanged or taken off at any time without the aid of tools. The driving means may be a motor impelled by electricity, compressed air or some other fluid, gaseous or liquid. Each spindle unit may have its own motor, or any number of units may be driven by a motor in connection with the use of flexible shafting or other means of transmitting motion and power, the motor evidently travelling along with the spindle units also in this case. If electric motors are used, these take the required electric current from stationary or travelling current carriers, in which case the endless chains, ropes or the like moving the spindle units can at the same time form the transmitting means for the current.

Every spindle unit has its own winding drum, roller or shaft, in order to permit its travelling in full operation along, for instance, the semi-circular ends of the machine.

The travel of the conveying means and therefore that of the travelling spindle units can be temporarily stopped automatically for the purpose of attending to them. There are cases in which a machine of a predetermined number of spindles cannot be fully utilized for some reason or other, say that there is only one person available for attending to it when the machine was designed to be attended by two persons, or that the spinning bobbins in the creel contain too little yarn for a long travel of the spindle units, or that only small lots of particular kinds of yarn are intended to be wound. For such reasons, the length of the machine and the number of spindle units are made variable in such a fashion that the lateral parts of the framing and the conveying means permit of shortening or lengthening at will, in which case the respective position of the frame ends is correspondingly altered. The movable part of the machine is then best arranged on rails to facilitate its displacement. The alterations in the length of the machine can be very quickly effected because according to the invention the spindle units can be easily taken-out or put-in. This fact has also another important economic value in that for machines of various lengths and different numbers of spindle units it is only necessary to keep in stock the machine end units and the lateral frame parts in predetermined standards, and the same is the case for the spindle units of which any number can also be kept in stock.

In this way, any desired length of machine can be combined and supplied, without necessitating the keeping in stock of complete machines.

The easy interchangeability of the spindle units has also the important advantage of permitting the immediate taking-off and replacement of a complete spindle unit in case of a possible disturbance, this being possible during working, i. e. without necessitating the stoppage of the machine.

The frame parts and the guiding members for the conveying means can also be fashioned so that in cases where floor space is restricted, the path of the travelling spindle units can be made to deviate at desired angles and as often as desired. The axes of the wheels intended to carry and move the endless conveying means have hitherto been always arranged standing in all machines of this kind. According to the invention, the axes can also be arranged horizontally and in other positions, and the conveying means may have a vertical, horizontal or slanting direction. In the latter case, two or more conveying means may be arranged side by side and interconnected by means of articulated rods, the spindle units being freely suspended between the conveying means or sideways of them. In cases where there is little floor space but plenty of height available, the conveying means may be vertically arranged and the machine can be attended to at some convenient height. All this is only possible if the driving means travels with the spindle units or if each spindle unit has its own driving means.

The invention is best illustrated by the following description of several embodiments thereof, taken in conjunction with the accompanying drawings wherein:

Fig. 1 is a front view of a machine constructed in accordance with the invention, Fig. 2 is a plan view thereof, Fig. 3 is a sectional view along one of the spindle units, Fig. 4 is a detailed front view of a pair of spindle units one being shown in section, Fig. 5 is a plan view of a pair of spindle units, Fig. 6 is a sectional view along a modification of a winding unit which embodies a rotary wing guide for guiding the thread, Fig. 7 is a front view corresponding to Fig. 6, with certain parts in section, Fig. 8 is a sectional view along a modification of a winding unit which embodies a split drum for guiding the thread, Fig. 9 is a front view corresponding to Fig. 8, with certain parts in section.

Figure 15:
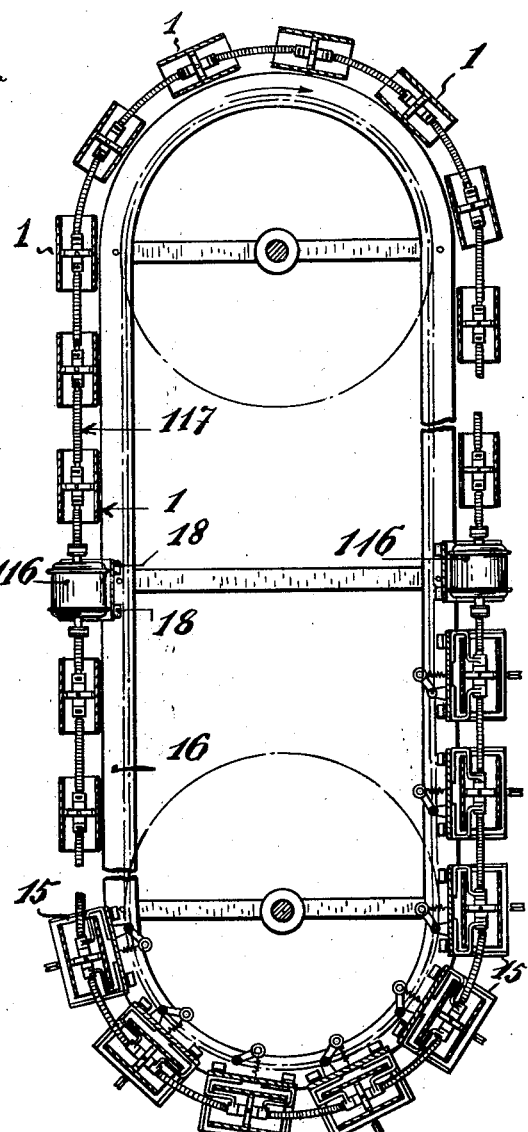

Fig. 10 is a sectional view along a modification of a winding unit which embodies a grooved drum for guiding the thread, Fig. 11 is a front view corresponding to Fig. 10, with certain parts in section, Fig. 12 is a front view of an embodiment of a winding unit in which the spool spindle is driven positively rather than by frictional contact, Fig. 13 is a plan view of Fig. 12, Fig. 14 is a plan view of an arrangement in which the movable motors drive a plurality of spindle units, Fig. 14a is an enlarged view of a detail of Fig. 14, Fig. 15 shows another form of the arrangement in Fig. 14, with certain parts in section.

Figure 25:
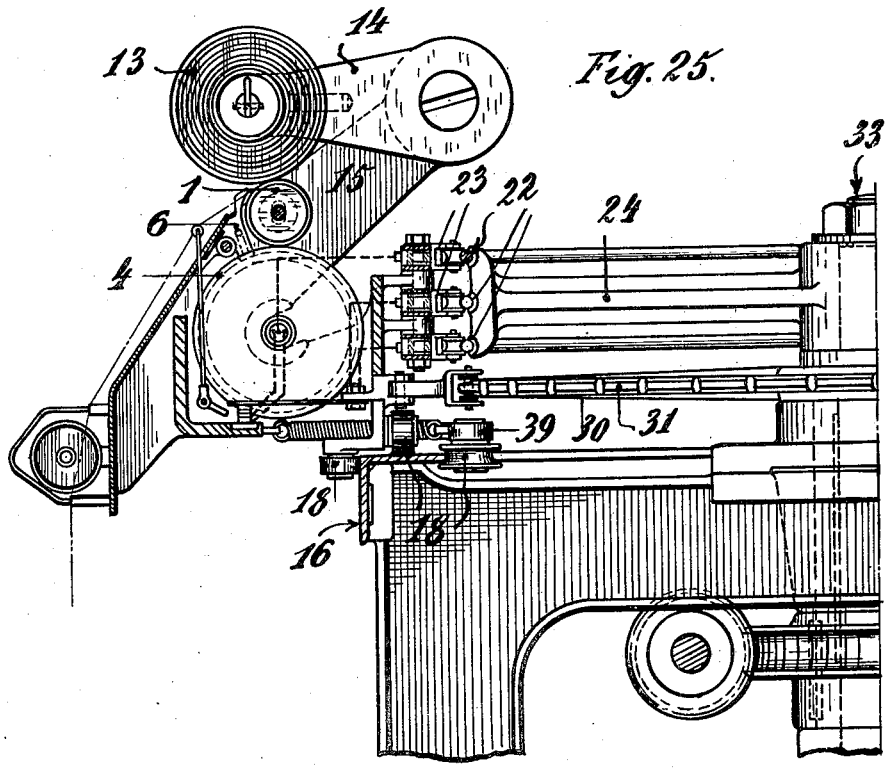
Figure 26:
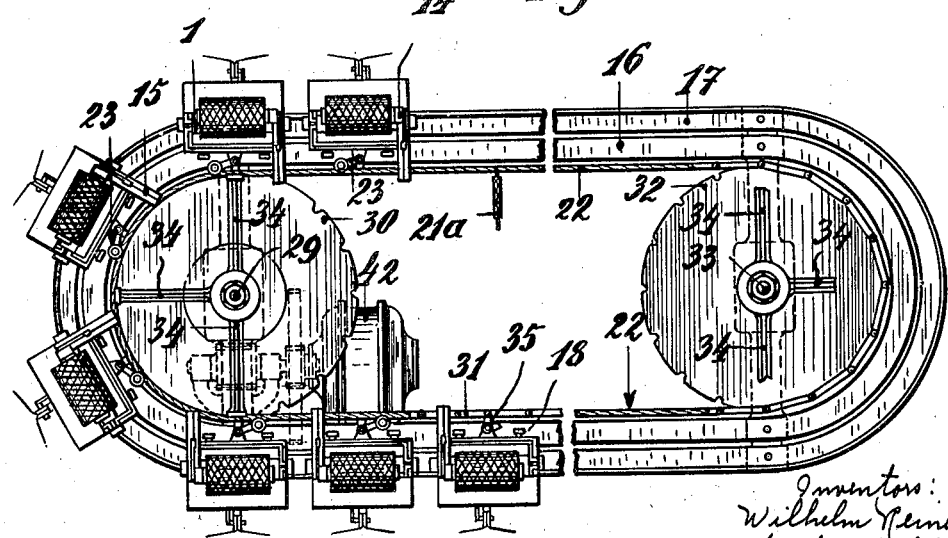
Figure 27:
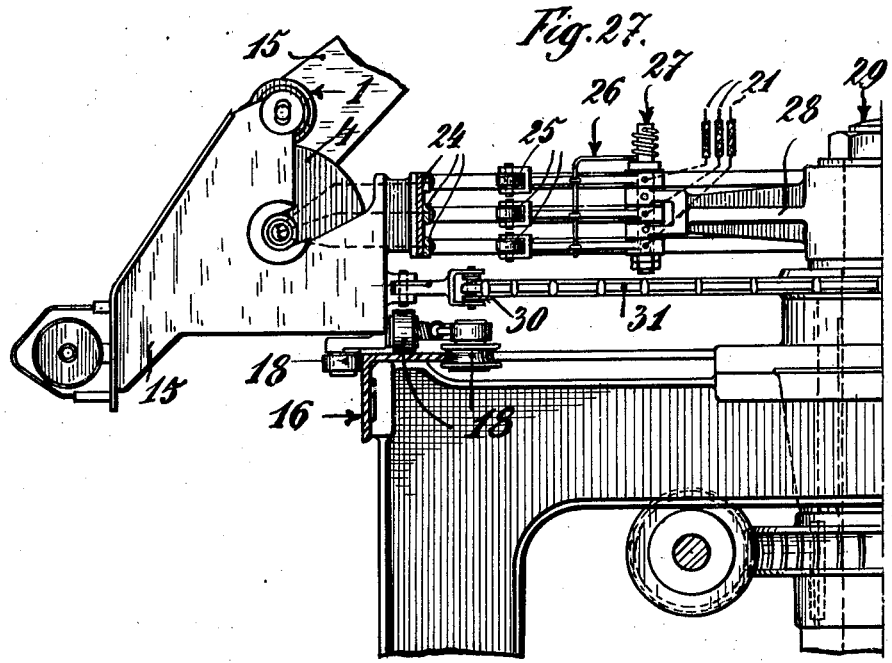
Figure 28:
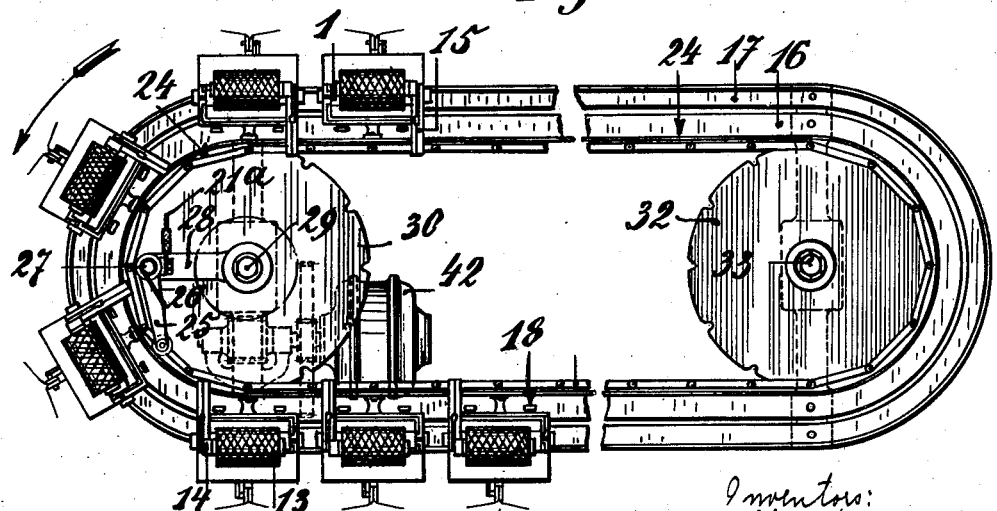

Fig. 15a is an enlarged view of a detail of Fig. 15,

Fig. 16 is a plan view of an arrangement having angularly disposed courses for the winding units, of which the plan view shown in Fig. 2 may be a part, Fig. 17 is a front view of a modified form of drive for obtaining an intermittent stoppage in the travel of the units in order to attend to them, Fig. 18 is a plan view corresponding to Fig. 17, Fig. 19 is a side view of an arrangement of winding units in which the latter move vertically, Fig. 20 is a front view corresponding to Fig. 19, Fig. 21 shows a modified duplex arrangement of Fig. 20, Fig. 22 shows another variation of Fig. 20, Fig. 23 is a sectional view along a spindle unit of a weft winding machine, Fig. 24 is a front view corresponding to Fig. 23, Fig. 25 is a sectional view of a modified arrangement for conveying the winding units and for conducting the energizing current to the driving motors, Fig. 26 is a plan view corresponding to Fig. 25, Fig. 27 is a sectional view of another arrangement of current feed, Fig. 28 is a corresponding plan view, Fig. 29 is a sectional view along a spindle unit which is readily detachable from the machine frame and the actuating elements, Fig. 30 is a plan view corresponding to Fig. 29, and Fig. 31 is a plan view of the machine frame showing its extensibility for the purpose of varying its capacity.

In all the illustrated embodiments, the travelling spindle unit comprises a body 15 with an arm 19 extending downward. Towards the interior of the machine, the body 15 carries guide rollers 18b, 18c and 18d. The guide roller 18b travels on the upper face of the track 16 connected to the frame parts 41, whilst the two other rollers 18c and 18d bear laterally against the track 16. The roller 18d, positioned towards the interior of the machine, is carried by a short arm 39 swinging in the body 15, for the purpose of permitting the grooved roller 18d to be taken off the flange of the travelling path by swinging out the arm 39. A spring 40 of the body 15 is intended to constantly press the lever 39 against the track. The lower end of the arm 19 carrying the running-off bobbin 20 is also fitted with a roller 18 which bears against the lower track 17. For the sake of safety, the lower end of arm 19 can be fitted with a peg 18a which may carry a counter-roll. It is therefore possible to raise the spindle unit after swinging out the arm 39 and to take the spindle unit off, because the connection of each spindle unit to the conveying means is easily detachable. Every body 15 carries, according to the design of the spindle unit, the spindle 66 for the package or bobbin 13 to be formed and which is arranged in a hinged arm 14. Each body further carries the member for driving, by means of surface friction, the bobbin or package to be wound, as for instance the winding drum or shaft, split drum or the like. Moreover each body 15 carries the yarn guiding members, a yarn detector 49, a yarn tension device 48, and in the case of electric driving, the contact devices, the current interrupters, and the motor.

As shown in Fig. 4, every spindle unit is fitted with a winding roller 1, easily detachable from the body 15, and which drives by means of surface friction the bobbin or package 13 to be made. The winding roller 1 itself is also driven by surface friction from the yarn guide roller 4 beneath. The yarn guide roller has on its surface cross-grooves for the to-and-fro movement of the yarn guide 6 which is steadied by sliding on the rod 6a. The yarn guide roller 4 is made hollow and fitted with end blocks turning on ball bearings 60 in casings 59 rotatably arranged on a fixed hollow shaft 61. The shell 4 of the yarn guide roller carries the outside armature of rotor 62 of an electric motor, whilst the inside stationary field or stator 63 is arranged on the fixed hollow shaft 61. The hollow shaft 61 also takes up the feed wiring 21a of the electric current.

When the yarn is run-out or broken, the yarn detector 49 as shown in Fig. 3 swings to the left and its second arm 49a raises the contact device which for instance may be arranged on a leaf spring 50, thus causing the contact 51 to be interrupted, whereby the electric motor comes to a standstill and the particular spindle unit in question is taken out of action, but it continues to travel along with the other units. In the case of three-phase alternating current, an arrangement as shown in Fig. 3 may be employed, with 3 endless travelling cables 21 which are carried on cable wheels 36 and 37. The cable wheels 36 and 37 respectively which are arranged one above the other, are placed each on a common shaft 29 and they are insulated from each other by plates 55. The electric current is fed by means of slip contacts 52 (see also Fig. 2) pivoted on a common peg 54 arranged on a stationary holder 53. The feed of the current from the three endless cables 21 to the travelling spindle units is effected by way of the toggles 38 which can be hinged to the corresponding holders of the carrier 15 of the spindle units. The cable wheels 36 and 37 possess notches 38a into which engage the toggles 38 with their contact places serving at the same time as teeth for the impulsion of the cables. The endless cables in this embodiment therefore serve at the same time to feed the current and as conveying means for the spindle units. For the purpose of driving the cables 21 serving at the same time as conveying means, it is for instance possible to use a stationary electric motor 42 which transmits its motion over gear wheels 43, 44 on to a helical gear 4., on a shaft 45, with the helical gear being in mesh with gear wheel 47 secured to the cable wheel shaft 29 (Fig. 3). The shaft 45 may be carried in a special frame part 45a.

In the embodiment shown in Figs. 6 and 7, the yarn guide roller of the previous example is replaced by the rotating wing guide 5 known in itself, the hollow shaft 61 of which is however stationary according to the invention. The rotating wing guide turns on the hollow shaft also in this case by the intermediary of ball bearings enclosed in housings 59. Its boss is enlarged so as to form a shell 56, the face walls 58 of which are developed into friction discs driving the winding shaft 1 by means of surface friction.

The wing guide is secured against displacement on the shell 56 by means of collars 57. Inside the drum shell 56 an electric motor may be arranged in similar fashion to that shown in Fig. 4. The action is essentially the same as in the case of the embodiment shown in Figs. 1 to 5.

In front of the wing guide, protecting plates 64 are arranged in known fashion in order to protect the operative from injury.

The working example as per Figs. 8 and 9 is distinguished from that shown in Figs. 6 and 7 by the use of the well-known split drum 2 instead of the winding shaft 1 and the wing guide. The interior of the split drum is fitted with an inside shell 65 to take the rotary motor 62, 63. Everything else corresponds to the details as shown in Fig. 4.

In the arrangement shown in Figs. 10 and 11, a helically grooved drum 3 is provided for the impulsion of the package 13 by means of surface friction, the yarn being traversed in known fashion by the helically arranged grooves 67 in the drum 3. Also in this case, the rotary motor 62, 63 is built into the drum 3.

In the embodiment shown in Figs. 12 and 13, the travelling spindle unit consists of a winding head of known design in which the bobbin 13 is driven positively instead of by surface friction as shown in the previous examples, the yarn guide being moved to-and-fro on a slide bar by a cam 19 in an oil box. The novel feature in the arrangement according to the present invention is the electric motor 101 being arranged on top of the oil box or on top of the travelling carrier 15, the front shaft end of the motor being extended as the winding spindle 66 while the opposite end carries the belt pulley 101a which drives a counter shaft by means of pulley 101c and belt 101b. The gear wheel 101d connected to the pulley 101c drives the large gear wheel 101e and the cam 10 which moves the yarn guide 8 to and fro.

Figs. 14 and 15 show an example in which every motor travelling along does not drive only one spindle unit but a number of them, an articulated or flexible shaft being made use of for the purpose.

In Fig. 14, the transmission of the power of the motor to the spindle units served by it is effected by means of rigid shaft ends 118 with intercalated ball joints 119; in Fig. 15 it is effected by means of flexible shafts 117. Also in these cases, each motor 116 may be a rotary motor with outside rotor, built into the spindle unit as represented in Figs. 4, 7 and 11, this spindle unit being connected with a group of spindle units by means of the above mentioned shafts 117, 118, 119. In these figures, the spindle units are only indicated, but they can be of a design according to any one of the embodiments described.

Fig. 16 shows a layout of which, for example, Fig. 2 may be a part, in which the path of the conveyor tracks 16, 17 for the spindle units are angularly arranged in case restricted floor space requires it. In this case, the conveying means 21 is guided round the conveying and guiding wheels 36, 32, 93 and 93a. If desired, the conveying track can take a straight line between the wheels 36 and 32, as shown in dotted lines. The spindle units 15 may be of any of the previously described designs.

In order to interrupt automatically the circulation of the conveying means and therefore that of the travelling spindle units in and for predetermined periods for the purpose of attending to the individual spindle units, the driving arrangement shown in Figs. 2 and 3 is replaced by that represented in Figs. 17 and 18. In this case, upon the shaft of the motor 42 is mounted a worm 120 meshing with the worm wheel 47 firmly secured to shaft 126. This shaft 126 also carries a cam 121 into the groove of which protrudes the peg 125 of the governing lever 124. On the governing lever 124 is hinged a catch 123, which is forced into the teeth of a ratchet wheel 122 by means of a spring. The gear wheel 128 securely connected to the ratchet wheel 122 gears with the wheel 129 which is in rigid connection with the chain wheel or sprocket 30. By turning the cam 121, the governing lever 124 is moved to and fro in such a fashion that for one revolution of the cam 121 the forward or travelling motion of the conveying means for the spindle units is one third and the respective stoppage two thirds. The proportion of the stoppage to the motion can be altered at will by a corresponding design of the cam.

In the embodiment shown in Figs. 19 to 22, the spindle units move in a vertical plane and they are swivelled on horizontal axes. The wheels 30, 32 driving and guiding the conveying means are carried on horizontal shafts 29, 33. The bottom shaft 29 is rotatably arranged in a frame 95 and it is driven by the motor 42. Evidently the driving may also be effected from the top shaft 33.

According to Figs. 19 to 20, there are two conveying chains 31a, 31b arranged side by side, with a corresponding space between. At certain distances both chains have a common stud 94 going through, which also ensures the parallel guiding of the chains relative to each other. On each stud 94, a spindle unit 15 is suspended in a swivelling fashion. In order to secure the vertical position, each unit can be fitted with a counterpoise weight 96 on a lever 97. The feed of the electric current to the motor of each spindle unit can be effected by means of cables placed into the conveying chains.

In the embodiment shown in Fig. 21, there are two spindle units side by side on each connecting stud 94, but even more of them may be arranged side by side. In such cases, the spindle units suspended side by side may be driven by a common motor.

A single conveying chain may also be used, as shown in Fig. 22, the chain being made correspondingly wide and the studs 94 protruding on one of the sides or on both sides, the protruding parts of the studs to take a spindle unit each, the position of which is secured against slipping-off by some kind of locking means 94a. The connection of the spindle units to the feed of the current can be effected by any suitable contacting means in any of these cases, say by pegging contacts.

Figs. 23, 24 show the application of the principle of the invention to a weft winding machine of any design so that it is unnecessary to describe the mechanism of the winding head. The example shown represents a vertical weft winding spindle 100 with pirn 98. The spindle is directly driven by the motor 101 arranged on the spindle unit and travelling along with it. All the other particulars of the spindle unit correspond to the examples previously described for winding machines. We are aware that the direct driving of a stationary spinning spindle by an electric motor is known, but not that of travelling spindle units.

Figs. 25, 26 show a different kind of current feed to the spindle units. Here, 31 is the conveying means developed as a chain by way of example. Over each chain sprocket 30, 32 is arranged a stationary crown of spokes and treble grooves 34 carrying the current cables 22 over which glide the springy contact plates 23 of each spindle unit. The feed of the current to the cables is effected at the point 21a.

Figs. 27, 28 show a further example of current feed. Here, the cables 24 are somehow loosely connected to the travelling spindle units with which they travel along. At some point inside the machine, a stationary arm 28 is arranged and carries slip contacts 25 bearing against the cables under the action of a spring 26. Here again, the travel of the spindle units is also effected as in the previously described working examples, by means of a chain wheel 30 and a chain 31 with which the spindle units engage by means of a suitable connecting means.

Figs. 29 and 30 show how every spindle can be taken off its conveying means and connected to it again. The detachable toggle is in this case a specially developed chain link 152 of the conveying means 31, 153 is a stud secured to the spindle units 15 and which is simply slipped into 152. The transmission of the current is here effected by means of slip contact levers 23 which with their rollers slide past the stationary current conductors 21 and which also detach themselves from the current conductors without the aid of a tool when taking the spindle unit out of the machine.

Fig. 31 represents the top view of a machine framing showing how the whole machine can be shortened or lengthened in longitudinal direction in simple fashion, by taking out or adding longitudinal parts of the track sections of the framing 41, of the conveying means 31 and of the current feed 21 not shown in the drawings. In effecting this change, the movable end A of the machine with its feet can be easily moved on the rails 154 say by means of wheels 155. If required, the connection or detachment of the shortened or lengthened machine frame parts can be effected quickly without the use of tools, by the aid of pressure levers, spring locks, band screws and the like which are not shown.

We claim:

1. In a machine for winding yarn spools, a series of winding units, each unit comprising a spindle for carrying the spool to be wound and a yarn guide for said spindle, an electric motor at each winding unit for operating the spindle and yarn guide, an endless conveyor on said machine consisting of at least as many cables as terminals of said electric motor, means for attaching said winding units to said endless conveyor, means for applying electrical energy to said cables for conduction to said electric motors through said attaching means, and means for moving said conveyor in a closed path on said machine.

2. In a machine for winding yarn spools, a series of winding units, each unit comprising a spindle for carrying the spool to be wound and a yarn guide for said spindle, an electric motor at each winding unit for operating the spindle and yarn guide, an endless conveyor on said machine consisting of at least as many cables as terminals of said electric motor, lugs for attaching said winding units to said cables, cable sheaves on said machine having notches therein for receiving said lugs, means for applying electrical energy to said cables for conduction to said electric motors through said lugs, and driving means for rotating one of said cable sheaves for impelling said winding units in a closed path on said machine.

3. In a machine for winding yarn spools, a series of winding units arranged in a closed path, each unit comprising a spindle for carrying the spool being wound and a yarn guide associated with said spindle, an endless conveyor for carrying said winding units, at least one electric motor carried along by said conveyor, flexible transmission means extending between said motor and said winding units for driving said spindles and yarn guides at any point in the course of said closed path, and means including said conveyor for conducting electricity to said motor at any point in said closed path.

4. In a machine for winding yarn spools, a series of winding units arranged in a closed path, each unit comprising a spindle for carrying the spool being wound and a yarn guide associated with said spindle, an endless conveyor for carrying said winding units, a plurality of electric motors carried by said conveyor, flexible shafts connected between said motors and said winding units for driving said spindles and yarn guides at any point in the course of said closed path, and means including said conveyor for conducting electricity to said motor at any point in said closed path.

5. In a machine for winding yarn spools, a series of winding units, each unit comprising a spindle for carrying the spool to be wound, driving motor means at each winding unit for rotating said spindle, an endless conveyor on said machine, means for actuating said conveyor in a closed path, means for attaching said winding units to said conveyor, and means including said conveyor for conducting energy to said driving motor means at any point in the course of said closed path.

6. In a machine for winding yarn spools, a series of winding units, each unit comprising a spindle for carrying the spool to be wound and a yarn guide associated with said spindle, a driving motor at each winding unit for operating said spindle and yarn guide, an endless conveyor on said machine, means for actuating said conveyor in a closed path, means for attaching said winding units to said conveyor, and means including said conveyor for conducting energy to said driving motor at any point in the course of said closed path.

7. In a machine for winding yarn spools, a series of winding units, each unit comprising a spindle for carrying the spool to be wound, driving motor means at each winding unit for rotating said spindle, an endless conveyor on said machine, means for actuating said conveyor in a closed path of a plurality of angularly disposed courses, means for attaching said winding units to said conveyor, and means including said conveyor for conducting energy to said driving motor means at any point in the course of said closed path.

8. In a machine for winding yarn spools, a series of winding units, each unit comprising a spindle for carrying the spool to be wound and a yarn guide associated with said spindle, a driving motor at each winding unit for operating said spindle and yarn guide, an endless conveyor on said machine, means for actuating said conveyor in a closed path of a plurality of angularly disposed courses, means for attaching said winding units to said conveyor, and means including said conveyor for conducting energy to said driving motor at any point in the course of said closed path.

9. In a machine for winding yarn spools, a series of winding units, each unit comprising a spindle for carrying the spool to be wound, an electric motor at each winding unit for rotating said spindle, an endless conveyor on said machine, means for actuating said conveyor in a closed path, means for attaching said winding units to said conveyor, and means for conducting electric energy through said conveyor for driving said motor at any point in the course of said closed path.

10. In a machine for winding yarn spools, a series of winding units, each unit comprising a spindle for carrying the spool to be wound and a yarn guide for said spindle, an electric motor at each winding unit for operating said spindle and yarn guide, an endless conveyor on said machine, means for actuating said conveyor in a closed path, means for attaching said winding units to said conveyor, and means for conducting electric energy through said conveyor and attaching means for driving said motor at any point in the course of said closed path.

11. In a machine for winding yarn spools, a series of winding units, each unit comprising a spindle for carrying the spool to be wound, an electric motor at each winding unit for rotating said spindle, an electrically conductive endless conveyor on said machine, guide wheels for said conveyor, means for actuating said conveyor in a closed path, means for attaching said winding units to said conveyor, means for applying electric energy to said guide wheels for conduction therefrom to said endless conveyor and to said electric motor for driving said motor at any point in the course of said closed path.

12. In a machine for winding yarn spools, a series of winding units, each unit comprising a spindle carrying the spool to be wound, an endless conveyor on said machine, means for driving said conveyor in a closed path, means for attaching said winding units to said conveyor, driving motor means mounted on said conveyor for driving said spindles, and means including said conveyor for conducting energy to said driving motor means throughout the extent of said closed path.

WILHELM REINERS.
GUSTAV KAHLISCH.